United States Patent
Liu et al.

(10) Patent No.: US 12,431,612 B2
(45) Date of Patent: Sep. 30, 2025

(54) VEHICLE FRAME AND VEHICLE

(71) Applicant: BEIJING BAIDU NETCOM SCIENCE TECHNOLOGY CO., LTD., Beijing (CN)

(72) Inventors: He Liu, Beijing (CN); Kuang Hu, Beijing (CN); Jing Zhao, Beijing (CN); Chao Ma, Beijing (CN); Xitong Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 353 days.

(21) Appl. No.: 18/153,298

(22) Filed: Jan. 11, 2023

(65) Prior Publication Data
US 2023/0170606 A1    Jun. 1, 2023

(30) Foreign Application Priority Data

Apr. 15, 2022   (CN) .................. 202220885578.X

(51) Int. Cl.
| | | |
|---|---|---|
| *B60R 11/04* | (2006.01) | |
| *G01S 7/481* | (2006.01) | |
| *G01S 17/86* | (2020.01) | |
| *H01Q 1/32* | (2006.01) | |
| *B60R 11/00* | (2006.01) | |

(52) U.S. Cl.
CPC .............. *H01Q 1/325* (2013.01); *B60R 11/04* (2013.01); *G01S 7/4811* (2013.01); *G01S 17/86* (2020.01); *B60R 2011/004* (2013.01)

(58) Field of Classification Search
CPC ... B60R 11/04; B60R 2011/004; G01S 17/86; G01S 7/4813; H01Q 1/32
See application file for complete search history.

(56) References Cited

U.S. PATENT DOCUMENTS

| | | | |
|---|---|---|---|
| 2016/0277079 A1* | 9/2016 | Fikar | H04L 67/12 |
| 2018/0304830 A1* | 10/2018 | Link | H02G 3/0462 |
| 2022/0097626 A1* | 3/2022 | Horai | B62D 33/0617 |
| 2022/0159330 A1* | 5/2022 | Stevens | H04N 21/25825 |
| 2022/0285831 A1* | 9/2022 | Huelsen | B62D 25/06 |

* cited by examiner

*Primary Examiner* — Tan Q Nguyen
(74) *Attorney, Agent, or Firm* — Seed IP Law Group LLP

(57) ABSTRACT

A vehicle frame and a vehicle are provided. The vehicle frame includes the vehicle frame includes a frame body and an antenna device, and the frame body includes a plurality of supporting beams fixedly connected and is further provided with a protection part; and the antenna device is mounted on the frame body, and the protection part is disposed outside the antenna device, to block the antenna device from an object in an external environment.

18 Claims, 3 Drawing Sheets

VEHICLE FRAME AND VEHICLE

CROSS REFERENCE TO RELATED APPLICATION

This application claims priority to Chinese Patent Application No. 202220885578.X, filed on Apr. 15, 2022, the contents of which are hereby incorporated by reference in their entirety for all purposes.

TECHNICAL FIELD

The present disclosure relates to the technical field of automatic driving, in particular to the technical field of automatic driving vehicles for education and training, and in particular to a vehicle frame and a vehicle.

BACKGROUND

An automatic driving technology is currently a popular research direction, and also an essential technology for realizing unmanned logistics, unmanned sanitation, unmanned disinfecting and the like in the future. In order to facilitate the education and popularization of the automatic driving technology, automatic driving vehicles are usually used as teaching aids in training and teaching. In related technologies, such automatic driving vehicles are usually provided with components such as positioning antennas, LiDAR devices, and camera devices.

However, the positioning antennas in the related art are prone to being damaged.

A technique described in this part is not necessarily a technique envisaged or adopted before. Unless otherwise indicated, it should not be presumed that any of techniques described in this part is regarded as the prior art only because it is included in this part. Likewise, unless otherwise indicated, the problem mentioned in this part should not be constructed as being recognized in any prior art.

SUMMARY

The present disclosure provides a vehicle frame and a vehicle.

According to an aspect of the present disclosure, a vehicle frame is provided, including: a frame body, including: a plurality of supporting beams fixedly connected and a protection part; and an antenna device, mounted on the frame body, where the protection part is disposed outside the antenna device, to block the antenna device from an object in an external environment.

According to an aspect of the present disclosure, a vehicle is provided, including: a chassis and the vehicle frame described above, and the vehicle frame is mounted on the chassis.

It should be understood that described contents in this part are neither intended to exclusively list features of the embodiments of the present disclosure, nor used to limit the scope of the present disclosure. Other features of the present disclosure will be understood through accessing the following specification.

BRIEF DESCRIPTION OF THE DRAWINGS

Accompanying drawings, which constitute a part of the specification, exemplarily illustrate embodiments and, together with text description of the specification, serve to explain example implementations of the embodiments. The illustrated embodiments are only intended to serve as examples without limiting the scope of the claims. In all the accompanying drawings, the same reference numbers represent similar but not necessarily the same elements.

DESCRIPTION OF REFERENCE NUMERALS

Figure 1:
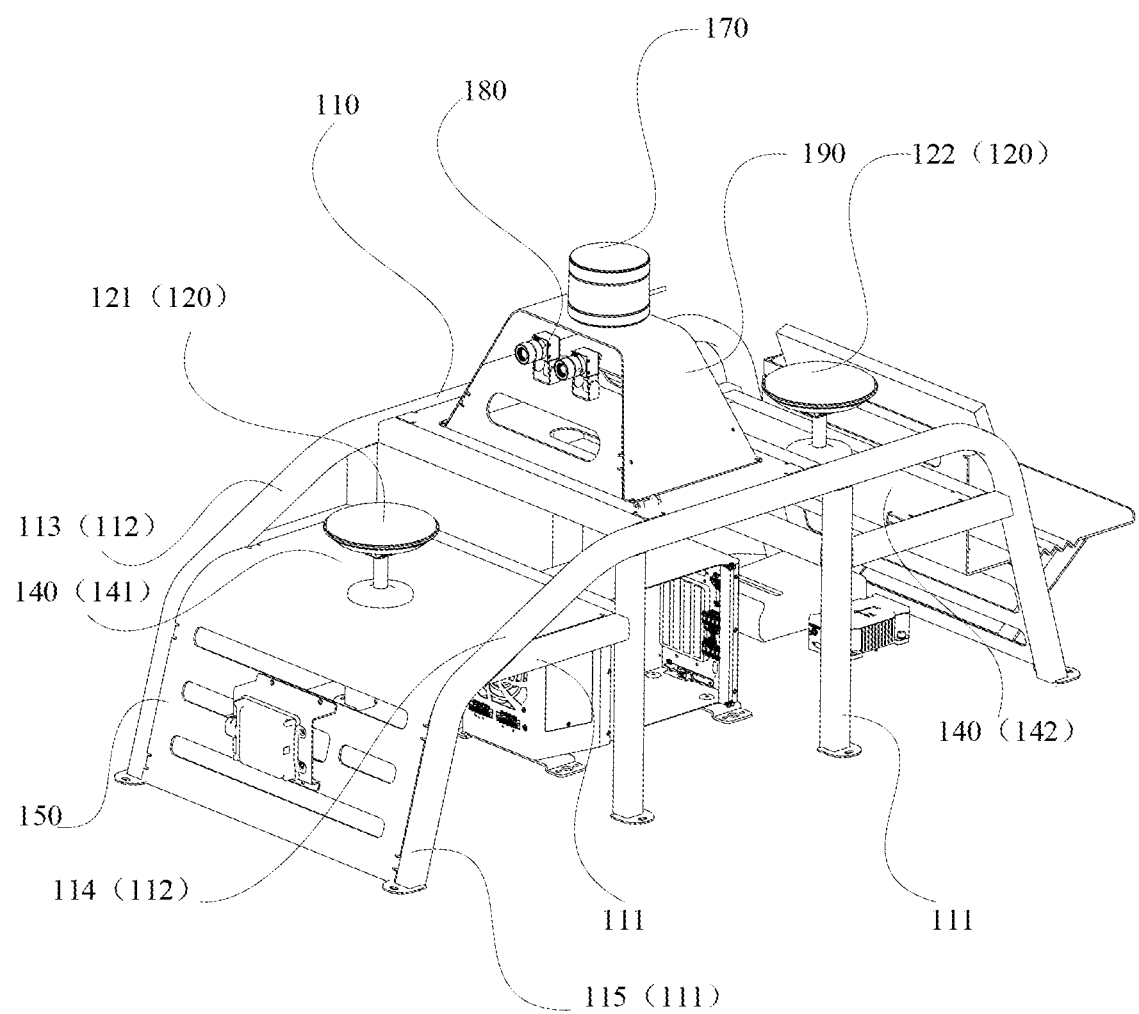
FIG. 1 shows a schematic structural diagram of a vehicle frame according to an embodiment of the present disclosure.

100: Vehicle frame; 110: Frame body; 111: Supporting beam; 112: Protection part; 113: First protection part; 1131: First sub-part; 1132: Second sub-part; 114: Second protection part; 1141: Third sub-part; 1142: Fourth sub-part; 115: Side beam; 1151: First bent section; 1152: Second bent section; 1153: Middle section; 120: Antenna device; 121: First positioning antenna; 122: Second positioning antenna; 130: Top plate; 140: Partition plate; 141: First plate body; 142: Second plate body; 150: Third plate body; 160: Fourth plate body; 170: LiDAR device; 180: Camera device; 190: Mounting seat; 191: Top wall; 192: Bottom wall; and 193: Side wall.

DETAILED DESCRIPTION OF THE EMBODIMENTS

Example embodiments of the present disclosure are described below with reference to the drawings, which include various details of the embodiments of the present disclosure for better understanding and should be regarded as only example. Therefore, those ordinarily skilled in the art should realize that various changes and modifications can be made to the embodiments described herein without departing from the scope of the present disclosure. Similarly, for the sake of being clear and concise, description of known functions and structures is omitted in the following description.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms such as "under", "below", "lower", "beneath", "above", "upper", etc. may be used herein for convenience description to be configured to describe the relationship of one element or feature to another element or feature as illustrated in the figures. It will be understood that these spatially relative terms are intended to cover different orientations of device in use or operation in addition to the orientation depicted in the figures. For example, if the device in the figures is turned over, elements described as "below other elements or features" or "beneath other elements or features" or "under other elements or features" would then be oriented "above other elements or features". Thus, example terms "below" and "under" can cover both an orientation of above and below. Terms such as "prior to" or "before" and "after" or "followed by" may similarly be used, for example, to indicate the order in which light travels through the elements. The device may be oriented in other mode (rotated by 90 degrees or at other orientations) and the spatially relative descriptors used herein are interpreted accordingly. In addition, it will also be understood that when a layer is referred to as being "between two layers", it can be the only layer between the two layers, or one or more middle layers may also be present.

The terms used herein are merely for the purpose of describing specific embodiments, and not intended to limit the present disclosure. As used herein, the singular forms "a", "an" and "the" are intended to include the plural forms as well, unless the context clearly dictates otherwise. It will be further understood that the terms "including" and/or "comprising" when used in this specification designate the presence of stated features, integers, steps, operations, elements and/or components, but do not exclude the presence or addition of one or more other features, integers, steps, operations, elements, components, and/or groups thereof. As used herein, the term "and/or" includes any and all combinations of one or more of the associated listed items, and the phrase "at least one of A and B" means A only, B only, or both A and B.

It will be understood that when an element or layer is referred to as being "on another element or layer", "connected to another element or layer", "coupled to another element or layer" or "adjacent to another element or layer", it may be directly on, directly connected to, directly coupled to, or directly adjacent to another element or layer, or middle elements or layers may be present. In contrast, when an element or layer is referred to as being "directly on another element or layer", "directly connected to another element or layer", "directly coupled to another element or layer" or "directly adjacent to another element or layer", no middle element or layer is present. However, in no case should "on" or "directly on" be interpreted as requiring a layer to completely cover the layer below.

The embodiments of the present disclosure are described herein with reference to schematic illustrations (and middle structures) of idealized embodiments of the present disclosure. As such, variations to the shapes of the illustrations are to be expected, e.g., as a result of manufacturing techniques and/or tolerances. Therefore, the embodiments of the present disclosure should not be construed as limited to the particular shapes of the regions illustrated herein, but are to include shape deviations, for example, due to manufacturing. Thus, the regions illustrated in the figures are schematic in nature and their shapes are not intended to illustrate the actual shapes of the regions of the device and are not intended to limit the scope of the present disclosure.

Unless otherwise defined, all terms (including technical and scientific terms) used herein have the same meaning as commonly understood by ordinarily skilled in the art to which the present disclosure belongs. It will be further understood that terms such as those defined in commonly used dictionaries should be construed to have meanings consistent with their meanings in the relevant art and/or the context of this specification and will not be idealized or overly interpreted in a formal sense, unless expressly defined as such herein.

In the related art, in order to facilitate the education and popularization of an automatic driving technology, automatic driving vehicles are usually used as teaching aids in training and teaching. Such automatic driving vehicles usually include vehicle bodies, vehicle bodies are provided with components such as positioning antennas, LiDAR devices, and camera devices, and the positioning antennas are mounted at the top ends of the vehicle bodies in a protruding mode.

Due to the unskilled operation in the training or teaching process, the vehicles may frequently collide or roll over. When the vehicles collide, the positioning antennas are likely to be scratched or collided with surrounding objects, and when the vehicles roll over, the positioning antennas are likely to be scratched or collided with the ground. These situations may easily cause damage to the positioning antennas.

Embodiments of the present disclosure provide a vehicle frame and a vehicle. By disposing a protection part on the vehicle frame and on the outer side of an antenna assembly, the antenna assembly can be protected. The present disclosure is described in detail below in combination with the embodiments.

Figure 2:
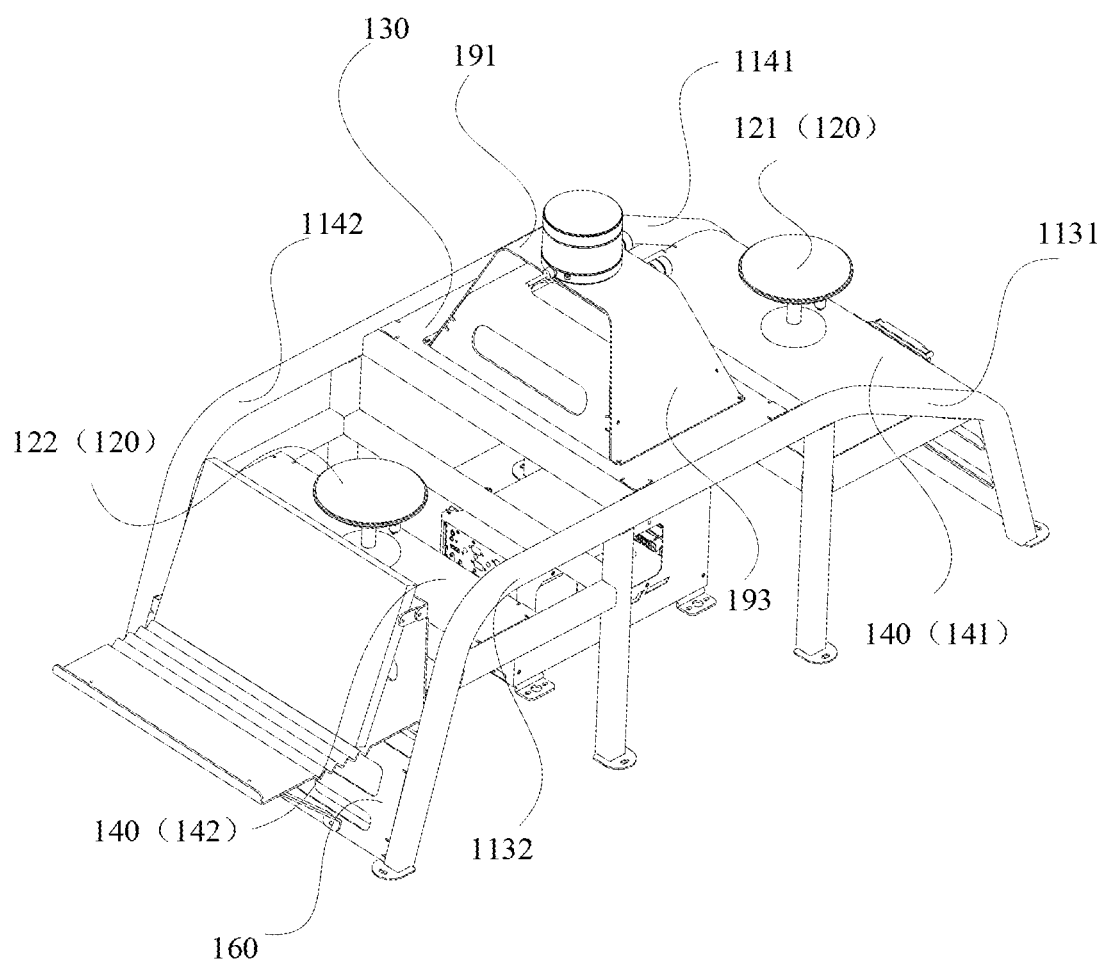
FIG. 2 shows another schematic structural diagram of a vehicle frame according to an embodiment of the present disclosure.
Figure 3:
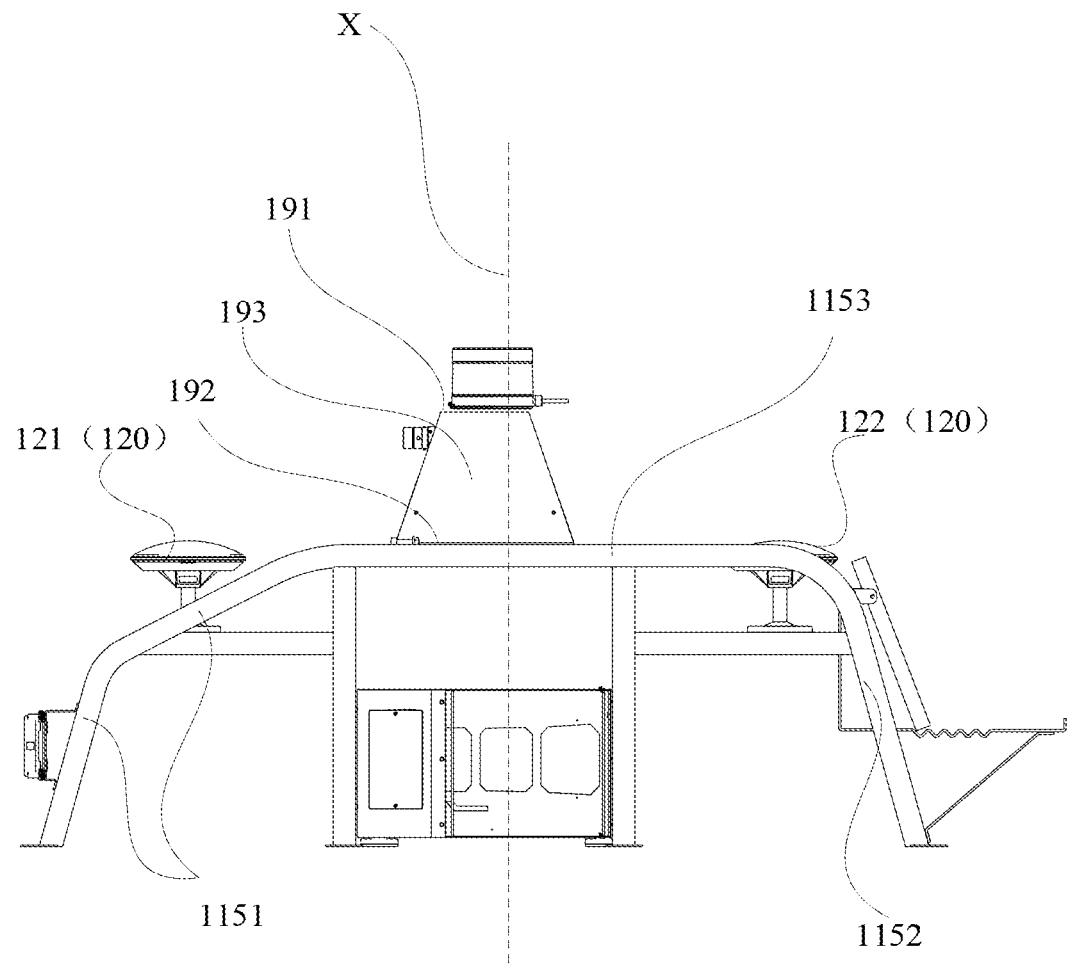
FIG. 3 shows a side view of a vehicle frame according to an embodiment of the present disclosure.

FIG. 1 shows a schematic structural diagram of a vehicle frame according to an embodiment of the present disclosure. FIG. 2 shows a schematic structural diagram of a vehicle frame according to an embodiment of the present disclosure. FIG. 3 shows a side view of a vehicle frame according to an embodiment of the present disclosure. It can be understood that the left end in FIG. 1 is the front side of a vehicle, the right end in FIG. 1 is the rear side of the vehicle, the left end in FIG. 2 is the rear side of the vehicle, and the right end in FIG. 2 is the front side of the vehicle.

Referring to FIG. 1 to FIG. 3, the present embodiment provides a vehicle frame 100 including a frame body 110 and an antenna device 120. The frame body 110 includes a plurality of supporting beams 111 fixedly connected and a protection part 112, and the antenna device 120 is mounted on the frame body 110. The protection part 112 is disposed outside the antenna device 120 to block the antenna device 120 from an object in an external environment.

The vehicle frame 100 may be used in a vehicle, e.g., in an autonomous vehicle including a low-speed unmanned vehicle, and the vehicle frame 100 may be connected to a chassis.

The vehicle frame 100 may include the frame body 110. The frame body 110 may be a main structure of the vehicle frame 100 serving as a support. The frame body 110 may include the plurality of supporting beams 111, and the plurality of supporting beams 111 may be fixedly connected by welding, screwing, bonding, etc. to form the contour structure of the vehicle frame 100. In addition, the shape and size of each supporting beam 111 may also be different and specifically set according to the shape of the vehicle frame 100.

It can be understood that in the present embodiment, the main structure of the frame body 110 is a frame structure composed of the plurality of supporting beams 111, and the exterior of the frame body 110 does not need to be covered with a large area of decorative panels. Thus, when the vehicle is used as a teaching aid, users may know the internal structure of the vehicle conveniently and quickly, so that hands-on disassembly is facilitated.

The antenna device 120 may be a common antenna structure capable of realizing positioning, such as an RTK antenna. The antenna device 120 may be fixed on the frame body 100 by means of screwing or the like.

The protection part 112 may be disposed on the frame body 110 and the protection part 112 may be disposed on the outer side of the antenna device 120, so as to block the antenna device 120 from the object in the external environment. It can be understood that the object in the external environment may include solid structures such as buildings, ground, and walls.

The protection part 112 may be disposed around the antenna device 120, or the protection part 112 may also only be disposed surround a part of the antenna device 120, that is, the protection part 112 is disposed not completely around the antenna device 120.

In addition, the protection part 112 may be a plate-like structure, a frame structure, a grid structure, a rod-like structure, etc., and the protection part 112 is not required to cover the whole outer side of the antenna device 120 if an effective barrier is formed by it.

During the driving of the vehicle, due to the blocking of the protection part 112, the antenna device 120 can be prevented from colliding with an object in the external environment, so that the antenna device 120 is protected. In addition, in case that the vehicle rolls over, the antenna device 120 will not directly collide with the ground due to the blocking of the protection part 112, so that the protection effect of the antenna device 120 can be further improved, the scratches and collisions of the antenna device 120 are reduced, and the probability of damage to the antenna device 120 is reduced.

In some embodiments, the protection part 112 includes a first protection part 113 and a second protection part 114, and the first protection part 113 and the second protection part 114 are located at two ends of the antenna device 120 in a first direction, respectively. The first direction is a transverse direction of the vehicle constituted by the vehicle frame 100.

It can be understood that the transverse direction of the vehicle is a direction perpendicular to both a driving direction (a longitudinal direction) and a height direction of the vehicle. As shown in FIG. 3, the z-axis direction is the transverse direction of the vehicle.

In general, a longitudinal dimension of the vehicle body is greater than its transverse dimension, in case that the antenna device 120 is disposed in the vehicle frame 100, two sides of the antenna device 120 in the transverse direction are more likely to be scratched and collided. By disposing the first protection part 113 and the second protection part 114 on two sides of the antenna device 120, the antenna device 120 may be effectively protected, and a space may also be provided for the antenna device 120 to transmit and receive signal.

In addition, when the vehicle rolls over, the sides in the transverse direction of the vehicle will hit the ground. In this case, due to the first protection part 113 and the second protection part 114 are respectively located at two ends of the antenna device 120 in the transverse direction, the first protection part 113 or the second protection part 114 will contact the ground first, thereby reducing or preventing the antenna device 120 inside the vehicle from further hitting the ground, so as to effectively protecting antenna components from being collided or scratched.

In some embodiments, the frame body 110 includes two side beams 115 spaced apart in the first direction. Each of the two side beams 115 forms one of the supporting beams 111, and the two side beams 115 together form an outer contour of the frame body 110. At least part of one of the two side beams 115 forms the first protection part 113, and at least part of the other of the two side beams 115 forms the second protection part 114.

As shown in FIG. 1, the two side beams 115 may be located at two ends of the vehicle in the transverse direction respectively, and the side beams 115 may be of a curved beam structure or a straight beam structure. The two side beams 115 may be configured to define at least part of the outer contour of the vehicle.

It can be understood that at least part of the antenna device 120 may be accommodated inside the outer contour of the vehicle, so that the two side beams 115 can be located at two ends of the antenna device 120 in the first direction, respectively. That is, at least part of the two side beams 115 on the two sides of the antenna device 120 may form the first protection part 113 and the second protection part 114 respectively, so that the two side beams 115 can be directly used to protect the antenna device 120 without additional structure, thereby the simple structure is easy to implement.

In some embodiments, as shown in FIG. 3, each of the two side beams 115 includes a middle section 1153, and a first bent section 1151 and a second bent section 1152 which are connected to two ends of the middle section 1153, respectively. The first bent section 1151 and the second bent section 1152 are bent relative to the middle section 1153, respectively.

It can be understood that the middle section 1153 may be disposed parallel to the ground, and the height of the middle section 1153 from the ground may be relatively high, so that the middle section 1153 can form the top surface of the vehicle frame 100. The first bent section 1151 and the second bent section 1152 may extend from the middle section 1153 toward the ground, and a distance between the first bent section 1151 and the second bent section 1152 may gradually increase from the end close to the middle section 1153 to the end close to the ground, thereby forming a generally smooth outer contour.

In addition, the first bent section 1151 may be a section extending along a straight line or may also be a section extending along an arc line or a polyline. Similarly, the second bent section 1152 may also be a straight line section, an arc line section or a polyline section.

In some embodiments, in one of the two side beams 115, at least one of the first bent section 1151, the middle section 1153 and the second bent section 1152 forms the first protection part 113. In the other of the two side beams 115, at least one of the first bent section 1151, the middle section 1153 and the second bent section 1152 forms the second protection part 114, so that protection can be achieved by the side beam structure, and the structure is simple and easy to implement.

In some embodiments, as shown in FIG. 2, the first protection part 113 includes a first sub-part 1131 and a second sub-part 1132 spaced apart in the driving direction of the vehicle. The second protection part 114 includes a third sub-part 1141 and a fourth sub-part 1142 spaced apart in the driving direction of the vehicle. The antenna device 120 includes a first positioning antenna 121 located between the first sub-part 1131 and the third sub-part 1133, and a second positioning antenna 122 located between the second sub-part 1132 and the fourth sub-part 1142.

For low-speed unmanned vehicles, to reduce the error of the vehicle heading, two positioning antennas are usually disposed. The two positioning antennas may be the first positioning antenna 121 and the second positioning antenna 122, respectively. The first positioning antenna 121 and the second positioning antenna 122 may be located at the front end and the rear end of the vehicle in the driving direction, respectively.

The first sub-part 1131 and the third sub-part 1141 may be located at two ends of the first positioning antenna 121 in the transverse direction, respectively. The second sub-part 1132 and the fourth sub-part 1142 may be located at two ends of the second positioning antenna 122 in the transverse direction, respectively. Therefore, the first positioning antenna 121 and the second positioning antenna 122 may be protected at the same time.

In regard to each of the two side beams 115 having the middle section 1153, the first bent section 1151 and the second bent section 1152, it can be understood that, also with reference to FIG. 3, for one of the two side beams 115 as shown in figure, part of the first bent section 1151 may form the third sub-part 1141, and part of the middle section 1153 and part of the second bent section 1152 may form the fourth sub-part 1142.

In some embodiments, the third sub-part 1141 may also be formed by a part of the middle section 1153, and the fourth sub-part 1142 may also be formed by only a part of the second bent section 1152.

In some embodiments, a top plate 130 is disposed between the two middle sections 1153. The frame body 110 is provided with a partition plate 140 configured to separate an inner space of the frame body 110. A height of the top plate 130 from the ground is greater than a height of the partition plate 140 from the ground.

The top plate 130 may be substantially parallel to the ground. The partition plate 140 may be parallel to the top plate 130. The partition plate 140 and the top plate 130 may form a plurality of layered structures. The top plate 130 and the partition plate 140 may provide a mounting platform for the antenna device 120, a LiDAR device 170, a camera device 180 and other expansion devices, such as OBU vehicle-mounted modules, to facilitate the mounting and expansion of devices. In addition, the partition plate 140 may be disposed inside the frame body 110, and a height of the partition plate 140 is lower than that of the top plate 130, that is, the partition plate 140 may not protrude from the outer contour of the frame body 110 to form the plurality of layered structures.

In some embodiments, the partition plate 140 may include a first plate body 141 and a second plate body 142 each parallel to the top plate 130. The first plate body 141 and the second plate body 142 are located at two ends of the partition plate 140 in the driving direction of the vehicle, respectively, so that the front and rear spaces of the vehicle frame 100 can be reasonably utilized to mount the devices.

Also refer to FIG. 1, an end of the first plate body 141 facing away from the second plate body 142 extends to a place between the two first bent sections 1151, and an end of the second plate body 142 facing away from the first plate body 141 extends to a place between the two second bent sections 1152.

As shown in FIG. 1, the first plate body 141 and the second plate body 142 may be located at the front and rear ends of the vehicle frame 100. The first positioning antenna 121 may be mounted on the first plate body 141. The second positioning antenna 122 may be mounted on the second plate body 142. Since the first plate body 141 and the second plate body 142 are located inside the vehicle frame 100, the first plate body 141 and the second plate body 142 form a sunken space together with the protection part 112, and the antenna device 120 is mounted in the sunken space, thereby further reducing the probability of damage.

In some embodiments, a third plate body 150 is disposed between the two first bent sections 1151, and the third plate body 150 is located on a side of the first plate body 141 facing away from the second plate body 142. A fourth plate body 160 is disposed between the two second bent sections 1152, and the fourth plate body 160 is located on a side of the second plate body 142 facing away from the first plate body 141.

The third plate body 150 may be inclined relative to the first plate body 141 in an extending direction of the first bent sections 1151, and the fourth plate body 160 may be inclined relative to the second plate body 142 in an extending direction of the second bent sections 1152.

The first plate body 141 may also be connected with the third plate body 150 to form an integrated structure, and the second plate body 142 may also be connected with the fourth plate body 160 to form an integrated structure.

The first plate body 141, the second plate body 142, the top plate 130, the fourth plate body 160 and the third plate body 150 may substantially cover the surface of the vehicle frame 100 facing away from the ground, so as to play a shielding role. In rainy days, it can effectively protect electrical devices on the vehicle chassis for a short period of time and provide time for users to drive the vehicle indoors or in a canopy, so that damage to the electrical devices is reduced.

In some embodiments, the vehicle frame 100 further includes: a LiDAR device 170; and a mounting seat 190 is disposed on a top of the top plate 130 facing away from the partition plate 140. The LiDAR device 170 is mounted on the mounting seat 190, and the mounting seat 190 is in contact connection with a surface of the top plate 130.

The LiDAR device 170 is connected to the top plate 130 by the mounting seat 190, so that the mounting height of the LiDAR device 170 can be ensured, and the LiDAR device 170 is not shielded. The mounting seat 190 is in contact connection with a surface of the top plate 130, so that the contact area between the mounting seat and the top plate can be increased, and the mounting strength of the LiDAR device 170 is improved.

As an implementation mode of the mounting seat 190, the mounting seat 190 may include: a top wall 191 and a bottom wall 192 disposed in parallel and spaced apart in a direction perpendicular to the top plate, and a side wall(s) 193 connected between the top wall 191 and the bottom wall 192. The bottom wall 192 is fitted to the top plate 130 and is fixed on the top plate 130, and the LiDAR device 170 is mounted on the top wall 191. The top wall 191 may provide a mounting platform for the LiDAR device 170, and the bottom wall 192 can increase the contact area with the top plate 130, thereby the mounting strength of the LiDAR device 170 is further improved.

The side wall 193 may be disposed around the entire edge of the top wall 191, or the side walls 193 may be disposed only on two sides of the top wall 191 in the first direction.

In some embodiments, an area of the top wall 191 is smaller than an area of the bottom wall 192, so that the mounting seat 190 is in a big-end-down table shape and has high structural stability.

In some embodiments, the vehicle frame 100 further includes a camera device 180 mounted between the top wall 191 and the bottom wall 192, so that the space of the mounting seat 190 can be reasonably used.

In one embodiment, a layer plate may be disposed between the top wall 191 and the bottom wall 192, and the camera device 180 may be mounted on the layer plate. The camera device 180 may be a monocular or binocular camera, etc., and may be configured to realize the automatic driving function. The camera device 180 is mounted in the top wall 191 and the bottom wall 192.

In addition, the vehicle frame 100 may further include a display device, which may be mounted at the rear end of the vehicle frame 100 to display vehicle parameters and the like.

In some embodiments, as shown in FIG. 3, the frame body X is asymmetrically disposed with respect to a plane that passes through a midpoint of the frame body 110 in the driving direction of the vehicle and is perpendicular to the driving direction of the vehicle, so that a headstock and a tailstock of the vehicle are convenient to distinguished.

As shown in FIG. 3, shapes of the first bent section 1151 and the second bent section 1152 may be different. The first bent section 1151 may be in the shape of a polyline, and the second bent section 1152 may be in the shape of a straight line, so that the front and rear ends of the vehicle is distinguished, and thus operators who use the vehicle for the first time can distinguish the headstock and the tailstock of the vehicle conveniently, thereby the occurrence of collision accidents is reduced, and safety is improved.

An embodiment of the present disclosure further provides a vehicle, including: a chassis and a vehicle frame 100 mounted on the chassis.

The vehicle may be an automatic driving or unmanned vehicle, etc., which may be controlled by a terminal such as a remote control. The chassis may be provided with electrical devices and tires of the vehicle, and the vehicle frame 100 may be mounted on the chassis by means of screwing, welding, clamping or the like. The structure and function of the vehicle frame 100 are the same as those of the above-mentioned embodiments, and for details, reference may be made to the above-mentioned embodiments, which will not be repeated here.

According to the vehicle provided by the embodiment of the present disclosure, the antenna device can be protected by disposing the protection part in the vehicle frame of the vehicle, so as to reduce or alleviate the occurrence of scratches or collisions on the antenna device, thereby reducing the probability of damage to the antenna device.

Although the embodiments or examples of the present disclosure have been described with reference to the accompanying drawings, it should be understood that the above methods, systems and devices are only example embodiments or examples, and the scope of the present disclosure is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

What is claimed is:

1. A vehicle frame, comprising:
a frame body, comprising a plurality of supporting beams fixedly connected to one another and a protection part; and
an antenna device, mounted on the frame body,
wherein the protection part is disposed outside the antenna device and configured to shield the antenna device from an object in an external environment;
wherein the protection part comprises a first protection part and a second protection part, and the first protection part and the second protection part are parallelly located at two ends of the antenna device in a first direction; and
wherein the first direction is a transverse direction of a vehicle in which the vehicle frame is included.

2. The vehicle frame according to claim 1, further comprising two side beams spaced apart in the first direction,
wherein each of the two side beams forms one of the supporting beams, and the two side beams together form an outer contour of the frame body, and
wherein at least a part of one of the two side beams forms the first protection part, and at least a part of another one of the two side beams forms the second protection part.

3. The vehicle frame according to claim 2, wherein each of the two side beams comprises a middle section, a first bent section, and a second bent section, the first bent section and the second bent section connected to two ends of the middle section, respectively, and wherein the first bent section and the second bent section are bent relative to the middle section, respectively.

4. The vehicle frame according to claim 3,
wherein in one of the two side beams, at least one of the first bent section, the middle section and the second bent section forms the first protection part, and
wherein in the other of the two side beams, at least one of the first bent section, the middle section and the second bent section forms the second protection part.

5. The vehicle frame according to claim 3, wherein a top plate is disposed between the two middle sections, and
wherein the frame body is provided with a partition plate configured to separate an inner space of the frame body, and wherein a height of the top plate from the ground is greater than a height of the partition plate from the ground.

6. The vehicle frame according to claim 5,
wherein the partition plate comprises a first plate body and a second plate body each parallel to the top plate, and
wherein the first plate body and the second plate body are located at two ends of the partition plate in a driving direction of the vehicle, respectively.

7. The vehicle frame according to claim 6, wherein an end of the first plate body facing away from the second plate body extends to a place between the two first bent sections, and an end of the second plate body facing away from the first plate body extends to a place between the two second bent sections.

8. The vehicle frame according to claim 6,
wherein a third plate body is disposed between the two first bent sections, and the third plate body is located on a side of the first plate body facing away from the second plate body, and
wherein a fourth plate body is disposed between the two second bent sections, and the fourth plate body is located on a side of the second plate body facing away from the first plate body.

9. The vehicle frame according to claim 5, further comprising:
a LiDAR device; and
a mounting seat disposed on a top of the top plate facing away from the partition plate,
wherein the LiDAR device is mounted on the mounting seat, and the mounting seat is in contact with and coupled to a surface of the top plate.

10. The vehicle frame according to claim 9, wherein the mounting seat comprises:
a top wall and a bottom wall disposed in parallel and spaced apart in a direction perpendicular to the top plate; and a side wall connected between the top wall and the bottom wall, wherein the bottom wall is fitted to the top plate and is fixed on the top plate, and the LiDAR device is mounted on the top wall.

11. The vehicle frame according to claim 10, wherein an area of the top wall is smaller than an area of the bottom wall.

12. The vehicle frame according to claim 10, further comprising a camera device mounted between the top wall and the bottom wall.

13. The vehicle frame according to claim 1,
wherein the first protection part comprises a first sub-part and a second sub-part spaced apart in a driving direction of the vehicle,
wherein the second protection part comprises a third sub-part and a fourth sub-part spaced apart in the driving direction of the vehicle, and
wherein the antenna device comprises a first positioning antenna located between the first sub-part and the third sub-part, and a second positioning antenna located between the second sub-part and the fourth sub-part.

14. The vehicle frame according to claim 1, wherein the frame body is asymmetrically disposed with respect to a plane that passes through a midpoint of the frame body in the driving direction of the vehicle and is perpendicular to the driving direction of the vehicle.

15. A vehicle, comprising a chassis and a vehicle frame, the vehicle frame comprising:
a frame body including a protection part; and
an antenna device, mounted on the frame body,
wherein the protection part is disposed about the antenna device and configured to shield the antenna device;
wherein the protection part comprises a first protection part and a second protection part, and the first protection part and the second protection part are parallelly located at two ends of the antenna device in a first direction; and
wherein the first direction is a transverse direction of the vehicle.

16. The vehicle according to claim 15, wherein the frame body comprises two side beams spaced apart in the first direction,
wherein each of the two side beams forms one of the supporting beams, and the two side beams together form an outer contour of the frame body, and
wherein at least a part of one of the two side beams forms the first protection part, and at least a part of another one of the two side beams forms the second protection part.

17. The vehicle according to claim 16, wherein each of the two side beams comprises a middle section, a first bent section, and a second bent section, the first bent section and the second bent section connected to two ends of the middle section, respectively, and wherein the first bent section and the second bent section are bent relative to the middle section, respectively.

18. The vehicle according to claim 17, wherein in one of the two side beams, at least one of the first bent section, the middle section and the second bent section forms the first protection part, and
wherein in the other of the two side beams, at least one of the first bent section, the middle section and the second bent section forms the second protection part.

* * * * *